United States Patent
Egan et al.

(10) Patent No.: US 8,311,968 B2
(45) Date of Patent: Nov. 13, 2012

(54) APPARATUS AND METHODS FOR ISOLATING AND REVIEWING DATA FROM MULTIPLE SOURCES

(75) Inventors: Donald G. Egan, Downingtown, PA (US); Joseph M. Fratoni, King of Prussia, PA (US); Daniel F. Hunt, Collegeville, PA (US); Matthew R. Cocking, Conshohocken, PA (US); Matthew K. Carter, Malvern, PA (US)

(73) Assignee: Data View, Inc., Malvern, PA (US)

( * ) Notice: Subject to any disclaimer, the term of this patent is extended or adjusted under 35 U.S.C. 154(b) by 562 days.

(21) Appl. No.: 12/217,325

(22) Filed: Jul. 3, 2008

(65) Prior Publication Data

US 2010/0005039 A1    Jan. 7, 2010

(51) Int. Cl.
   *G06N 5/02* (2006.01)
(52) U.S. Cl. ....................................................... 706/47
(58) Field of Classification Search ..................... 706/47
   See application file for complete search history.

(56) References Cited

OTHER PUBLICATIONS

Archived http://www.dataviewinc. Mar. 2005. 9 pages total.*

* cited by examiner

*Primary Examiner* — Lut Wong

(57) ABSTRACT

Methods, apparatus and articles of manufacture are disclosed for isolating and reviewing data. The data is provided via a data source, and subsequently a rule may be provided, as well as a metaphor, to a user for perception of said metaphor via a user interface.

108 Claims, 5 Drawing Sheets

APPARATUS AND METHODS FOR ISOLATING AND REVIEWING DATA FROM MULTIPLE SOURCES

BACKGROUND OF THE INVENTION

Isolating and reviewing data, especially from multiple sources, has proven difficult for any number of reasons. One reason is volume—available data is often too voluminous to review with efficiency. Another reason is compatibility—especially when connecting to multiple data sources. For example, business "dashboards" known in the art are generally sold by vendors to interface with a proprietary data source, e.g., SAP America might have a dashboard which specifically interfaces with SAP's proprietary data sources. However, such a dashboard may have difficulty interfacing with another vendor's proprietary data source and attendant interface, because of data compatibility, interface compatibility, platform compatibility, etc. issues.

Finding relevant data and/or relationships among and between data also may be difficult, simply because display interfaces—whether software based, such as reports, etc. or hardware based—often are relatively fixed. For example, what might be meaningful data or relationships to one individual or company may well be meaningless to another.

DETAILED DESCRIPTION OF THE PREFERRED EMBODIMENTS

Preferred embodiments provide apparatus and methods for isolating and reviewing data from multiple sources. One or more user Interfaces are provided. Embodiments may be local, networked, available through a distributed architecture, server side, client side, web services, applications, as otherwise known in the art, etc.

Figure 1:
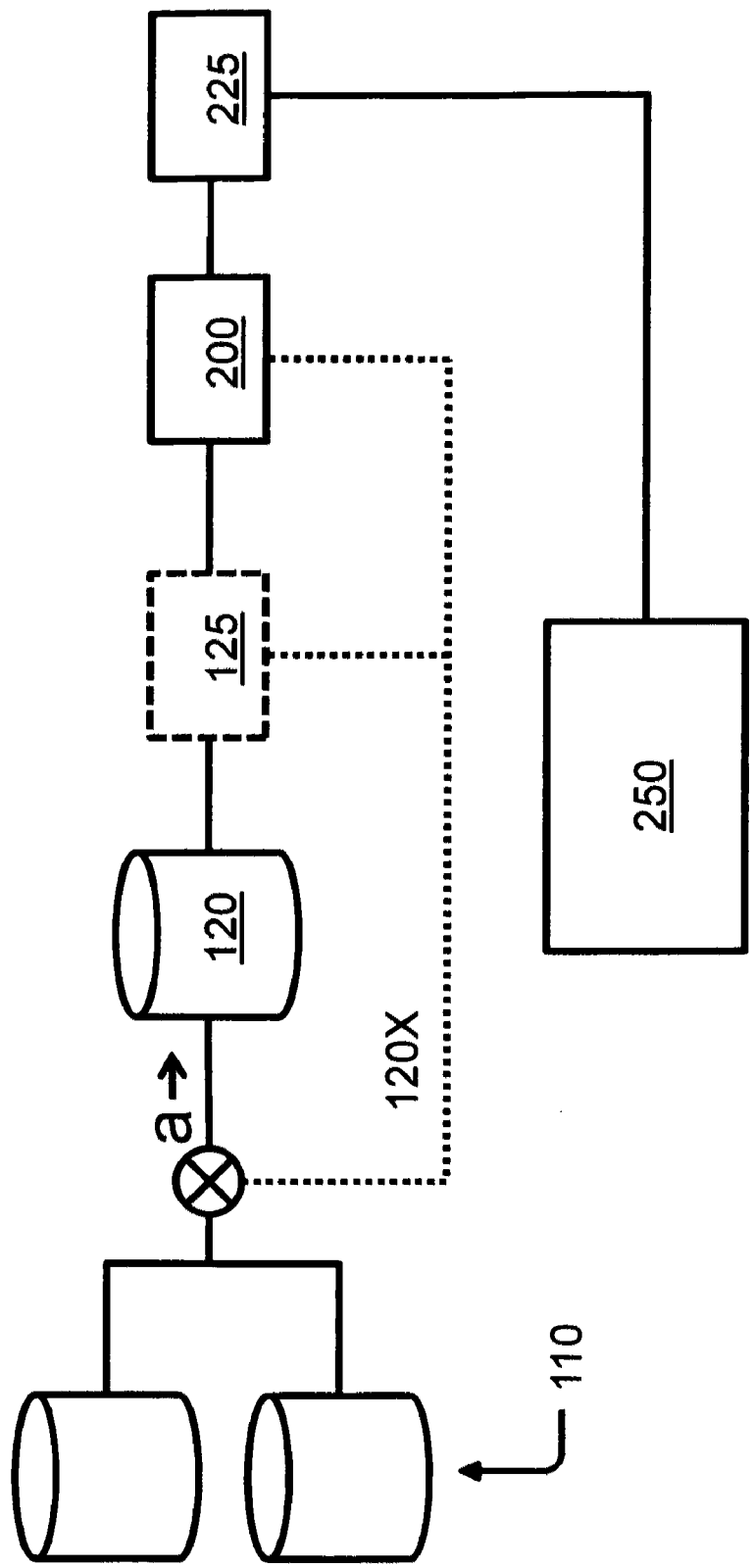
FIG. 1 shows a preferred embodiment.

Turning to FIG. 1, a preferred embodiment is shown. Data sources, e.g., data warehouses, data marts, operational datastores, local databases, content aggregators, web services, raw data, real time data, line data feed from sensors and the like, raw data generators, and other mechanisms, manipulated (which term includes analyzed and collected) data, data from manual or other input, and as otherwise known in the art, etc. are shown generally at 110. Any or all of the data sources are local, networked, available through a distributed architecture, server side, client side, as otherwise known in the art, etc.

One or more of the data sources provides data a to data storage component 120. Data storage component 120 is for providing data a to Rules Engine 200 as will be further described below, and may be a database, spreadsheet, cache, or other storage component, as otherwise known in the art, etc.

Data a is used here for illustrative purposes—in various embodiments data a may be one or more datums from any and/or all of data sources 110. Also, in embodiments, data storage component 120 may not be present or used for less than all data sources. An alternative data path 120X is shown for such embodiments in FIG. 1.

Various embodiments may store data a in local caches. For example, local caches might be used if nested or other Rules are to be applied to the data, and/or as desired.

Data a may require translation, and so data translation component 125 is shown, which is for translating data if necessary into a compatible format. Data translation component 125 may be manual, automatic, a combination of manual and automatic, as otherwise known in the art, etc. It should be noted that various embodiments may include security features for data storage component 120 or at other points, components, as otherwise known in the art, etc. For example, caches may be flushed, data may be tagged, as otherwise known in the art, etc. Rules Engine 200 is for providing Rules to data, as is further described below.

Metaphor Engine 225 is for providing Metaphors to Interface 250. A Metaphor, in various embodiments, may bear some resemblance to the context of data a. Thus abstract data a may be associated with a concrete referent. For example, a Metaphor showing characteristics of an office may be used to show data related to an office's operation.

User Interface 250 is for providing user perception of Metaphors. An Interface may be of various types. So, for example, in an embodiment wherein a user Interface is graphic, Metaphors are then provided in the form of graphics (which term, as used herein is after Tufte, E. R., "The Visual Display of Quantitative Information," Graphics Press (1983): "graphics are instruments for reasoning about quantitative information," Introduction at p. 1.)

Other embodiments may have different representations of Metaphors as desired—usually linked to the nature of the Interface. For example, an HTML Interface in a web browser may contain animation, sound, and/or other multimedia Metaphors.

Various embodiments may use modal Metaphors. A modal Metaphor as used herein is a Metaphor that directly or indirectly evokes one or more specific modes of human sensory experience: a specific quality of data (which is provided by a Rule, as is further described below) is represented by a sight, sound, touch, smell, and/or taste Metaphor. The nature of the mode is according to user Interface 250.

In various embodiments, as described herein, Metaphors are modified in whole or part according to changes and/or characteristics of data a. So for example, if a datum potentially has two characteristics, e.g., RED or GREEN, a Metaphor representing that datum will change according to the specific characteristic of the datum, e.g., either RED or GREEN. Metaphors may also change according to a function of the characteristics of data a. So, as one example out of others known in the art, the change in characteristics as a function of time may be represented by a Metaphor characteristic of a datum. Others as known in the art may be represented as well.

Metaphors in various embodiments are often linked to data through a Rule or Rules and are modified according to a Rule or Rules. Metaphors may also change according to a function of the characteristics of relationships among and/or between data a, as set by a Rule or Rules. So, for example, relative changes between two data points may be established by a Rule and represented by a Metaphor.

Embodiments may also have "delinked" Metaphors as desired. Such Metaphors, once created and/or modified pursuant to data, may be set as such, and not change even if associated data changes. Such delinking may be as desired and be changed dynamically as desired.

One or more Metaphors (not shown) are provided in user Interface 250.

Returning to Rules Engine 200, which is for providing rules which are for providing a value for the creation of and/or modification of a Metaphor or Metaphors, and/or Metaphor characteristics, directly or indirectly, in whole or part according to data a, its characteristics, relationships between and among data, and as otherwise as may be desired. Rules may be single (uni-variant,) multivariant, combine data as desired, nested (one Rule's output or outputs can be another Rule or Rule's input or inputs) etc. Rules may have more than one input and more than one output. Rules may also be a constant or result in a constant (e.g., a Rule with no input, etc.) and may be present where desired.

For example, a Rule may be used to provide a modification of a Metaphor depending upon a range: if a datum has a value within an acceptable range, a Rule may provide a modification to a Metaphor. If a Metaphor is visual, the modification may be an indicator such as a green color indicating a datum is acceptable. It should be noted that Rules may exist for the same data but for different Metaphors. So for example, the same datum may be used in Rules that provide output to different Metaphors (which may be present in the same or different Interfaces.)

Metaphors may also provide for user interaction in various embodiments. For example, as is further described below with regard to an embodiment, a user may, by using an input device, explore Metaphors through an input device such as a mouse in a web browser type visual display.

Figure 2:
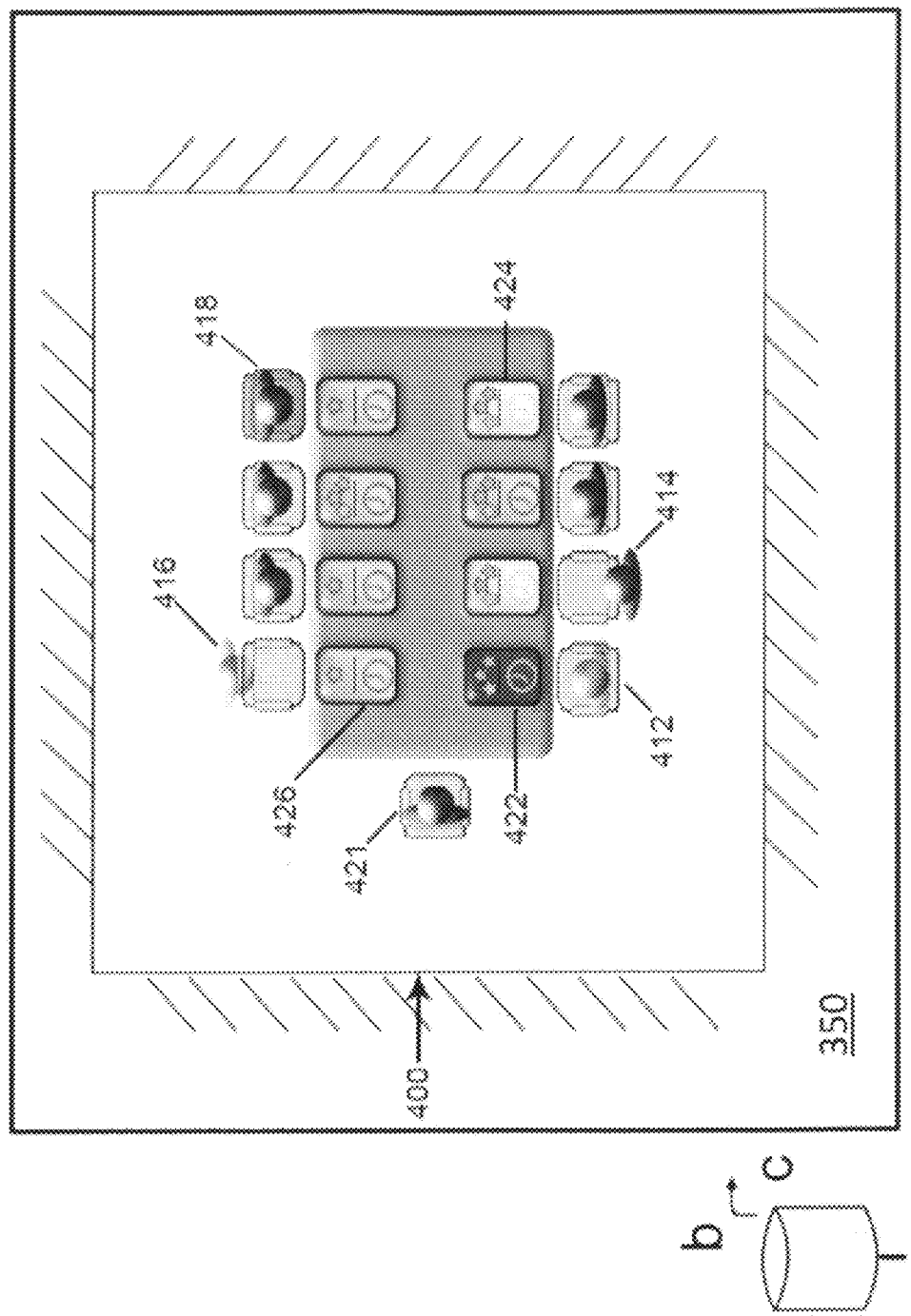
FIG. 2 shows a preferred embodiment.

Turning to FIG. 2, for example, an embodiment of a User Interface 350 is shown. This Interface is a visual display upon a screen, accessible by a user with a World Wide Web browser. Interfaces, in this and other embodiments, may be programmable. So for example here the Interface is programmed using HTML code so as to be available using a compatible browser. Here Metaphors are displayed using appropriate code and Rules generating appropriate code according to the data received, so code and thus Metaphors change according to the data received and the code generated. Of course, coding may be as desired, and may be Interface dependant to some degree. For example, JavaScript or other code may be used in a WWW embodiment, as otherwise known in the art, etc.

Input devices are compatible with the user Interface. So for example a web browser type display may have a touch screen, mouse, touch pad, trackball, audio device, as otherwise known in the art, etc. as an input device.

An Office Display 400 is shown within user Interface 350. Within Office Display 400 are Person and Chair Metaphors (e.g., 412, 414, 416, 418, 421) and Tablet Metaphors (e.g., 422, 426.) Each Person and Chair Metaphor represents a position within an office. So, for example, Person and Chair 421 shows a Department Manager while Persons and Chairs 412, 414, 416, 418 show the positions that report to the Department Manager.

Modification of a Metaphor's graphic characteristics is for providing data in this embodiment. So, for example, a position may be held by a permanent or acting appointee, and data store 405 (e.g., a personnel data store) is for providing data b about a person's status—whether he or she is permanent or acting. Data b is input, e.g. through a network, into a Rule (not shown) that provides, through its formula, resultant code for a graphic value for modification of Persons and Chairs. So if a person, such as the holder of the Department Chair, is permanently appointed to the position, then data b will contain that information, and so Person and Chair 421 Metaphor shows a person sitting in a chair. If another person has an acting status, such as the holder of the position shown by Person and Chair Metaphor 414, the person is shown standing behind its associated chair, indicating the person holding the position is an acting appointee.

Other examples are shown by the Person and Chair 416 and Person and Chair 418. In Person and Chair 416 the Person is translucent, indicating the Position Status is presently not filled (not held by any individual) and in Person and Chair 418 the Chair is transparent, indicating a temporary position.

Also shown in FIG. 2 are examples of Project Metaphors (e.g., 422, 424, 426.) These are Metaphors representing projects of the positions. So Project Metaphors 422, 424 and 426 are associated with the positions shown by Person and Chair Metaphors 412, 414 and 416. Project Metaphors 422, 424 and 426 may have different colors (e.g., Red, Green and Yellow.) Those color representations provide information on those projects as the colors represent progress of those projects (e.g., red for projects that have been stopped; yellow for slowed projects; green for projects with acceptable progress.) Here can be seen the links between Person, Chair and Project Metaphors, as Metaphors may be linked to each other as well. (Data c shows data input for the projects. Rules and any Rules Engine are not shown.)

The creation of and/or modification of a Metaphor or Metaphors, and/or Metaphor characteristics, directly or indirectly, in whole or part according to data, its characteristics, relationships between and among data, includes but is not limited to various modifications suitable to the user Interface. So for example, if an embodiment comprises a graphic user Interface, Metaphors, provided in the form of graphics, would be modified according to graphic characteristics. Other Metaphors may be modified as desired—usually linked to the nature of the Interface. For example, an HTML Interface in a web browser may contain animation, sound, and/or other multimedia Metaphors, and such will be modified as appropriate.

It should also be noted that Metaphors may also interact with each other and/or the Interface or other components of the display. Such may be shown, for example, through relative positioning and other relative characteristics of Metaphors with relation to each other and/or the Interface. Additionally, in embodiments where Metaphors may be modal Metaphors, any modifications may as well evoke one or more specific modes of human sensory experience.

The Metaphors in this and various other embodiments are multidimensional. (Metaphors may also be one dimensional, switchable from one to multi dimensional, as otherwise known in the art, etc. in various embodiments.) Nesting may be provided so that, through user interaction with the Metaphor by a mouse click or other compatible input device, further Metaphors, data, etc. may be shown by interacting with the Metaphors. For example, by clicking on the Person Metaphor, data on the actual position holder may be shown. As another example, by clicking on the Project Metaphors, further Metaphors on development, manufacturing, shipping, marketing, etc. (depending upon the nature of the project) may be shown.

Nesting of Metaphors may be of various types. For example, hierarchical nesting, lateral nesting, as otherwise known in the art, etc. may be used. The nature of the nesting may be determined by the environment. So, for example, hyperlinking may be used to provide one type of nesting in one type of environment, (e.g., an HTML environment.)

Metaphors may also be interactive with a data store or other components. So, for example, in the embodiment shown in FIG. 2, a user may be able to move a Person Metaphor from one position to another—indicating for example the person holding the position has had his or her status changed from permanent to temporary. The associated data in the data source will change as a result.

Thus, at a glance, a user of embodiments such as those of FIG. 2 can see information about an office, the positions and projects assigned to the office, the status of positions, the progress of those projects, other information desired, etc.

Figure 3:
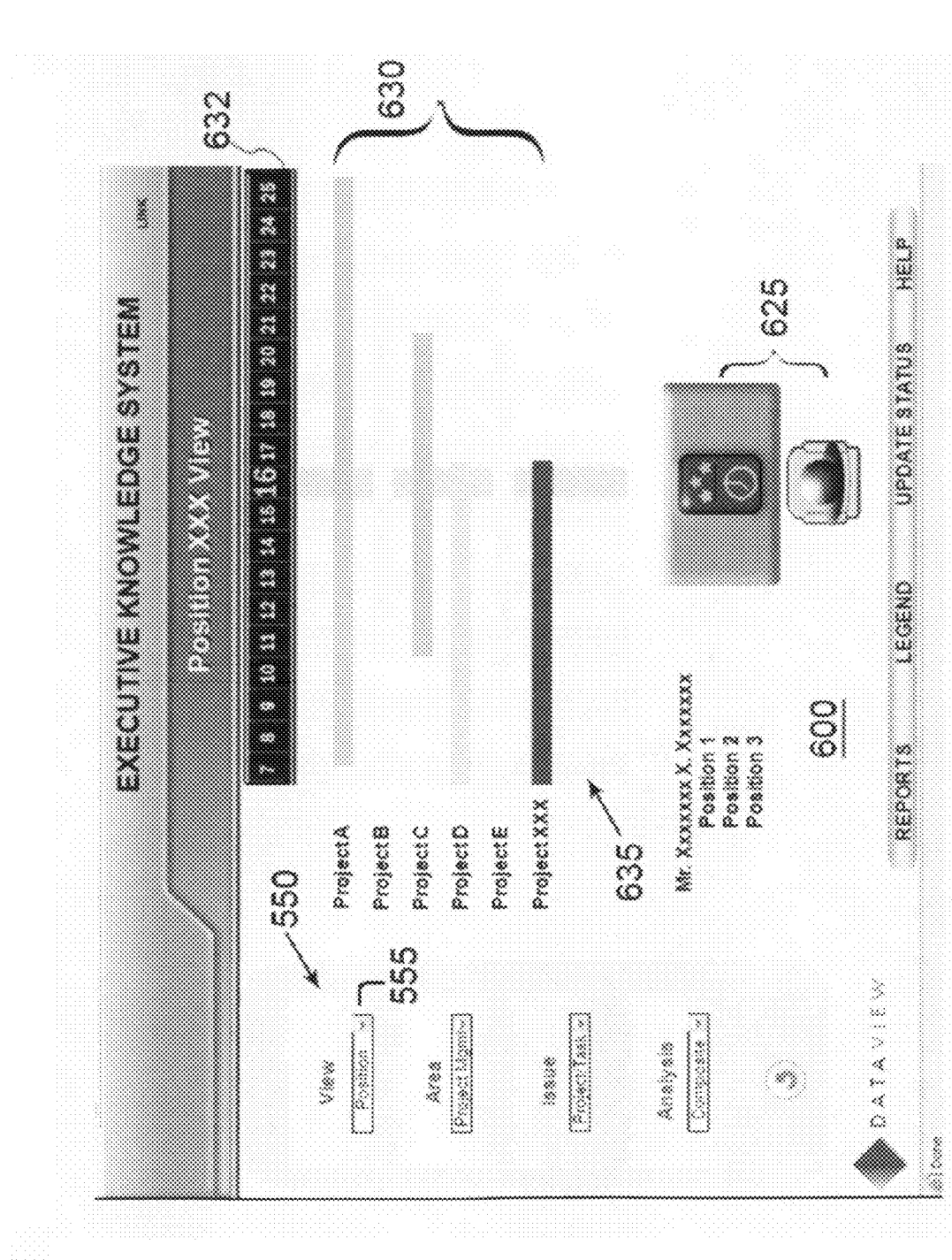
FIG. 3 shows a preferred embodiment.
Figure 4:
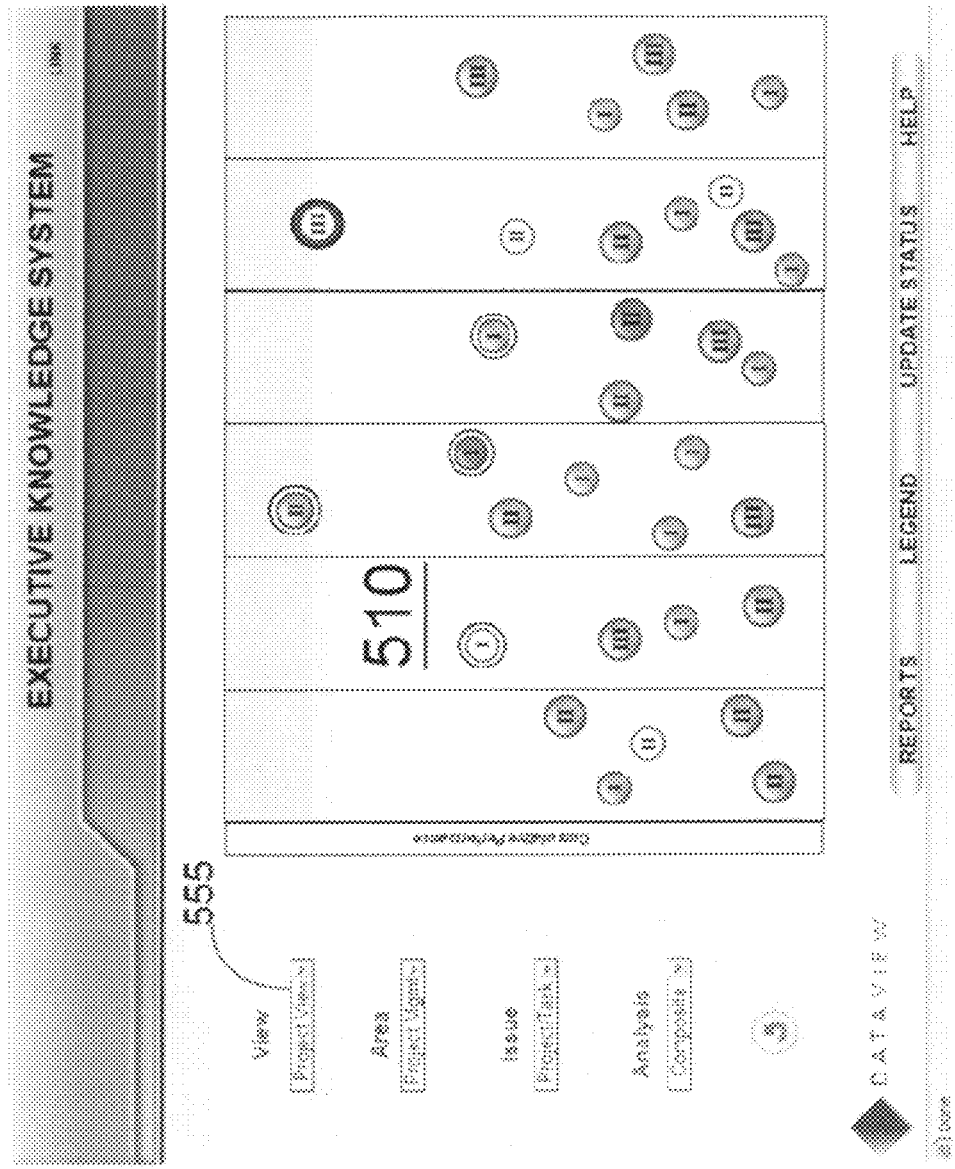
FIG. 4 shows a preferred embodiment.

Turning briefly to FIGS. 3 and 4, another embodiment is shown. This embodiment comprises a number of views of an Executive Knowledge System embodiment. The embodiment draws data from various sources and presents the data in various graphic Metaphors in a graphic Interface to various entities who might be appropriate users of the embodiment.

For example, turning briefly to FIG. 3, at Area 550, Selector 555 for a desired "View" is shown. This selector provides here, through choosing "Position" as an option, Views of the Interface and Metaphors appropriate to a Position, (e.g., CEO, President, CFO, etc.) Another option available under Selector 555 is shown in FIG. 4, where "Project View" has been chosen as an option.

The difference in the Views between FIG. 3 and FIG. 4 is seen as result of the varying selections under the View Selector. Turning briefly back to FIG. 3, Area 600 shows various graphic Metaphors associated with the Position View. Person, Chair and Tablet Metaphors are shown generally at 625, similar to those in the embodiments described above. Task Line Metaphors are shown generally at 630. Each of the lines illustrates the status of the Projects named in Area 635, as a function of the time graph shown at 632, through variations in color of the Metaphors: Red, Green and Yellow. Those color representations provide information on those projects as the red, yellow and green represent progress of those projects (red for projects that have been stopped; yellow for slowed projects; green for projects with acceptable progress.)

The Metaphors here are multidimensional. So, for example, if desired, a user may interact with a Metaphor (here though clicking) to review other Metaphors. So, for example, a user may desire to further examine progress of other data of interest on Project A. By clicking on the Task Line, other data may be viewed in the form of desired Metaphors.

Other Selectors shown here are "Area;" "Issue;" and "Analysis." Each of these, when selected, is for providing appropriate displays under their respective options. In this embodiment, the following displays are available under the identified Selector:

Views

Position, Project, Team, Organization, Financial, Performance, Location, Client

Area

Project Mgmt, Financial, Sales, Regional, Division, HR, Staffing,

Issue

Project/Task, Purchase Order, Patient, Adverse Events, Experience, Clearance Level, Budget, Training Analysis Composite, Current Performance, To-Date Performance, Productivity, Quality, Schedule, Cost Turning briefly to FIG. 4, another embodiment is shown, that of a Knowledge System at 510. Each Circle Metaphor is labeled by a Project's Phase (I, II or III.) The relative Positions of the Metaphors show status of the Projects—some are in the Acceptable (green) Area; others are in Warning (yellow) Area, and yet others are in the Delayed (red) Area. The latter may return to the Acceptable (green) area if appropriate events occur. This is a time and/or event based embodiment, and the Circle Metaphors may be used as set forth herein regarding Metaphors. For example, Metaphors set in Metaphors may be especially useful in certain embodiments.

Figure 5:
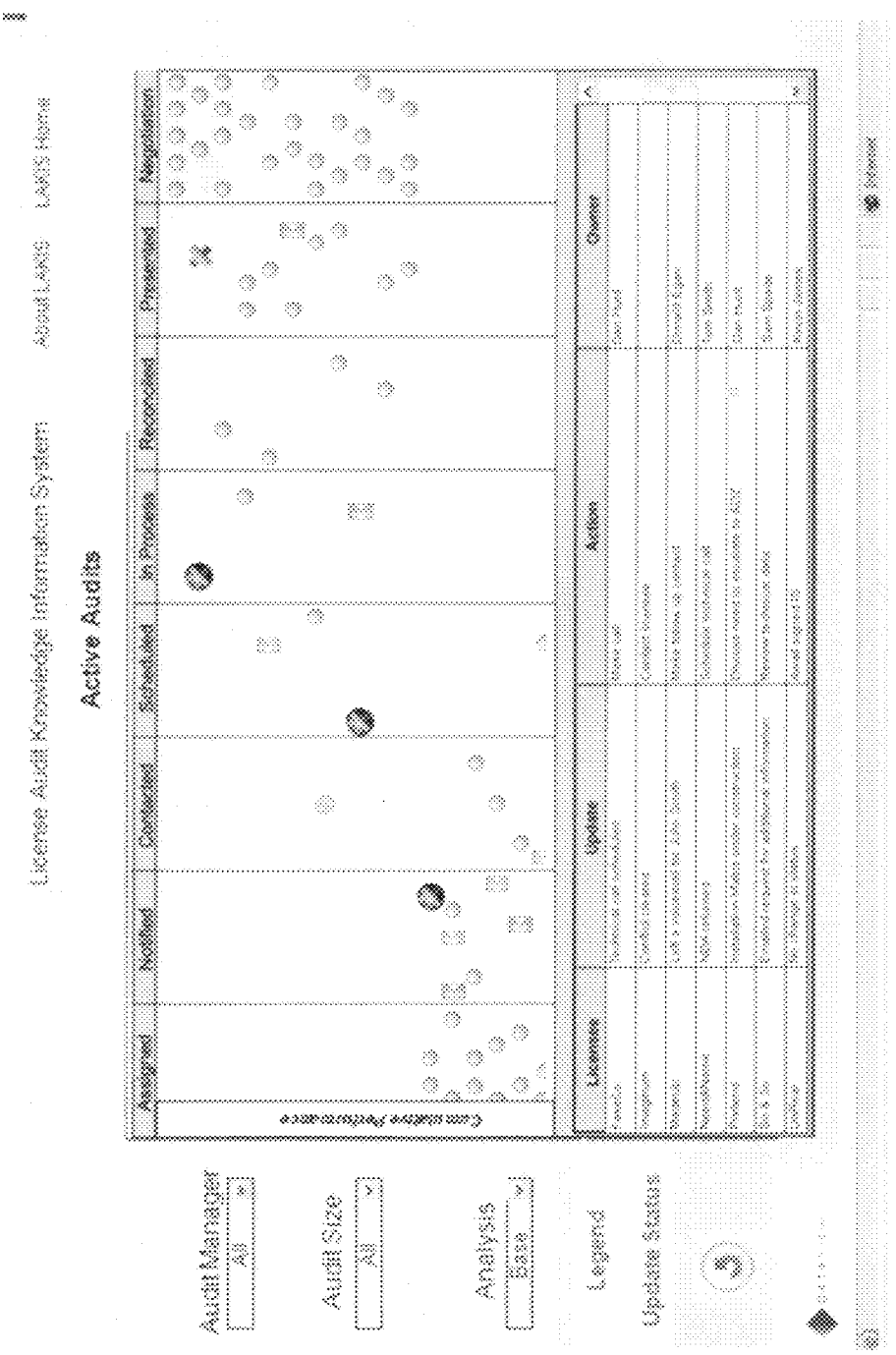
FIG. 5 shows a preferred embodiment.

FIG. 5 shows another embodiment of a License Audit Management System. The sizes, colors, outlines, and other characteristics of the Metaphors are for providing data regarding various attributes and/or analysis of same; for example, sizes for correlation to desired data, e.g., size, cost, etc., colors for correlation to appropriate data, e.g., cost productivity or other data of interest to the auditor or appropriate user; e.g., time data, which may change various attributes and/or analysis of same. As noted above, attributes, etc. may change according to the user's needs. So for example Circles might be colored differently for client or auditor. If the audit discovers additional revenue for the client, the ball in the client's view will change from silver to gold. In the auditor's view, it wouldn't change, because it is not relevant to his needs.

(Embodiments, such as those shown at FIGS. 3, 4 and 5, can be nested within each other as desired of course.)

In various embodiments, Metaphors are present within displays or other presentations (which in turn are present within user Interfaces although in various embodiments a user Interface may provide a presentation as well) that provide a theme or pattern to the Metaphors, so as to provide meaningful presentations. So, for example, in the embodiment shown in FIG. 2, the theme or pattern is that of a conference room within an office, which provides a user with a familiar reference for the Metaphors.

Usually themes or patterns are used that are meaningfully perceived to the user. So for example, an enterprise user Interface may begin with a display of an office building (which may be stylized, a picture of an actual building used by the enterprise, as otherwise known in the art, etc.) By maneuvering through the display, such as for example, by clicking on various areas of the building, the user is able to "drill down" to the various units or departments of the enterprise through a Metaphorical presentation. For example, by clicking on entrance to the building, the user could be presented with a virtual directory, which would when clicked upon, provide data through a Metaphorical presentation associated with the various units or departments of the enterprise, e.g., production, accounting, administration, as otherwise known in the art, etc. In such embodiments, the nesting of Metaphors proceeds according to a navigation plan or framework. For example, Metaphors and views may be provided and viewed in context according to need, requirements, the user's role, title, interests, position, as desired, etc. Embodiments may provide for views according to user queries as well.

Navigation plans or frameworks may be provided as appropriate to the Interface. An informed navigation system may be used if desired, to provide a user with guidance in constructing his or her preferred Interface. A navigation system may as well in various embodiments provide for dynamic navigation, presenting the user with a shifting view dependant on desired and/or parameters, e.g., need, requirements, the user's role, title, interests, position, etc. So, for example, dynamic Interfaces may be provided, which allow for construction from Metaphors such as personnel. A conference room view may be used to construct a grouping of desired personnel by dragging their Metaphors into said room. These and other static and dynamic constructions may be provided as desired.

In various embodiments, Metaphors may be predetermined, dynamically constructed, etc. Metaphors may also be in one or more classes. Class embodiments may include Group Metaphors and Individual Metaphors. Group Metaphors include: Location Metaphors, for representing geographical and similar items; Building or Facility Metaphors, for representing events, collections (e.g., inventory, etc.) production and similar items; and, Organization Metaphors, for representing organizational processes, people and other resources and their interconnections. Individual Metaphors include: Object Metaphors, for representing individual data items, such as individuals, individual items and similar items; Project or Task Metaphors, Process Metaphors, for representing progress of tasks or other objects of interest; Time Metaphors, for representing the effect of time on objects of interest, Status Metaphors, etc. Whether or not Metaphors fall within a class, it should be noted that Metaphors may be used that represent almost any thing that may be desired, for example, tangible and intangible processes, objects, etc. Moreover, in various embodiments, a toolkit or toolkits of Rules, Metaphors, patterns, etc. may be available for construction of various views.

Presentations and/or user Interfaces are usually configured to be compatible with various user operating systems, applications and/or devices. So, for example, a user Interface may be used that is compatible with a World Wide Web Browser on a desktop computer; a PDA; smart phone, etc. such as asp pages, .php pages, etc. The Metaphors in various embodiments are appropriate to the Interface and to any pattern provided by the Interface. Moreover, Metaphors that may be used in one Interface may not be appropriate for another Interface. However data used in various Metaphors might be the same. So for example, it might be desirable in various embodiments to provide Metaphors that show the same data in different ways.

The construction of a theme or pattern as well as the Rules and Metaphors contained therein may be from a plan or model. Such a plan or model may be of a theoretical construct. For example, Metaphors, and their characteristics, may be drawn from a business plan or model that projects performance within an office setting, such as a short or long term organizational plan, project plan, phase duration model, resource allocation model, consultant's model, etc., and the data used is compared using appropriately constructed Rules, with a Metaphor or Metaphors representing progress as compared to the plan or model. For example, a Rule may be constructed showing progress against a project plan along the lines of the embodiment shown in FIG. 2, so that Progress Metaphors and associated colors (red, yellow and green) represent progress against the milestones set by the plan.

Various embodiments may construct a theme or pattern as well as the Rules and Metaphors therein from a particular business's practices and/or model as well as or in addition to a theoretical construct. These embodiments proceed with the identification of a model and may as well proceed with identification of any problems with the model and/or available data. In these and other embodiments, any missing data might as well illustrate issues and/or problems—missing data that should exist might illustrate that the business is operating less efficiently than it should as it should be collecting that missing data in order to evaluate performance. In these and other embodiments, once the business is modeled, appropriate Rules and Metaphors can be identified.

Various embodiments may be used to identify issues with business and other modeled process and/or objects. For example, if a phase duration model is modeled, (which may be used to identify progress) certain slow areas may be identified through Metaphors showing slowdowns in progress. As another example, a resource allocation model may show that certain persons, departments, units, etc. are overassigned and so those can be reassigned (or "rebalanced") to provide a more even project flow.

Various embodiments may show different themes or patterns as well as Rules and Metaphors depending upon the user. A president or CEO of a business for example, might want different views with different Metaphors and (possibly different data) than a line manager. Embodiments such as these that provide a subjective view—one based upon the user—may provide preconstructed themes, with Metaphors chosen accordingly. Embodiments may also provide the user with the ability to construct his or her own view, and such may include desired themes or patterns and/or Metaphors desired. These and other embodiments may proceed upon an issue identification or other basis to show and/or construct a theme or pattern by providing the user with options for views (whether preconstructed or constructed dynamically) through requesting data from the user including title, issues of concern to users, performance metrics (e.g., time, financial, production, etc.)

Construction of themes or patterns, Rules and Metaphors, whether dynamic, preconstructed, or some combination, is done in various ways in various embodiments. For example, a "bottom up" construction may be preferred, and is often used where a particular business is being modeled. In this type of construction a model is constructed as was further described above, and then the model is populated with appropriate data. It may be desirable in other embodiments to proceed from a "top-down" type model, where the user provides the theme or pattern desired. The Metaphors and associated Rules are then supplied and the data provided to give the user the desired view. (It should be noted that "view" is used herein to describe a perceivable embodiment which, as noted above, may or may not be based in whole or part upon a visual display.)

Uses of various embodiments include but are not limited to; Trouble shooting; Efficiency Analysis; Executive Information Systems; Command and Control; Project, Process, and/or Program Management and Analysis; Time/Phase/Performance Analysis; Manufacturing and/or Facility Analysis; Financial Management (e.g., Sarbanes-Oxley Compliance); Monitoring (e.g., Performance based); Visual Regression Analysis; Service Analysis; Scorecards and/or Metrics, and/or Models constructed along various theoretical, proposed, simulated and/or other conditions, Business or Entity Specific Models and Uses, such as Pharmaceutical (e.g., time to market, clinical trial progress, etc.,) Manufacturing, Marketing, Governmental Performance, Educational Performance, including but not limited to Administration, Teacher, Student, Class, and other factors and data, Personal Performance, and/or any others of interest, as well as other desired uses.

The present invention may be implemented with any combination of hardware and software. If implemented as a computer-implemented apparatus, the present invention is implemented using means for performing all of the steps and functions described above. The present invention also can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

We claim:

1. A computer-based method for isolating and reviewing data comprising an educational performance system configured for:
provniding administration, teacher, student, and/or class data via more than one data source, with at least one of said more than one data source providing data through a network, to a data storage component, and wherein said more than one data source consists of data warehouses, data marts, operational datastores, local databases, content aggregators, web services, raw data, real time data, line data feed from sensors and/or raw data generators, and wherein said data storage component consists of a database, spreadsheet, or cache;
providing first and second rules to said data via a rules engine, said rules comprising a function of the characteristics of relationships among and/or between data;
providing at least two metaphors wherein each of said metaphors provide a concrete referent for said data via a metaphor engine, and wherein a first of at least two of said metaphors is modified in whole or part via a value provided to said first metaphor by said first rule, and wherein a second of at least two of said metaphors is modified in whole or part via a value provided to said second metaphor by said second rule, and wherein each of said at least two metaphors consist of a graphic, sound or touch metaphor; and,
providing user perception of said at least two metaphors and any modification of said at least two metaphors via a presentation comprising a theme or pattern configured via user interaction, wherein said interaction consists of user title, user authorization, user issues of concern, and/or enterprise performance metrics within a networked user interface compatible with said metaphors.

2. A method as in claim 1 wherein at least one of said at least two metaphors is delinked from either of said rules following creation and/or modification according to said rule.

3. A method as in claim 1 wherein either of said rules consist of uni-variant, multivariant, combinations of data from said data sources or is nested.

4. A method as in claim 1 wherein either of said rules has more than one input and more than one output.

5. A method as in claim 1 wherein either of said rules is a constant.

6. A method as in claim 1 wherein either of said rules provides a modification of said at least one of said at least two metaphors depending upon a range.

7. A method as in claim 6 wherein, if as determined by either of said rules said data has a value within an acceptable range, then said rule provides a modification to at least one of said at least two metaphors.

8. A method as in claim 1 wherein at least one of said at least two metaphors provides for user interaction.

9. A method as in claim 1 further comprising an input device.

10. A method as in claim 9 where said input device comprises a mouse, trackball, audio device or touch screen device.

11. A method as in claim 1 wherein at least one of said at least two metaphors is interactive.

12. A method as in claim 11 further comprising interaction with said second of said at least two metaphors, said user interface and/or other components of the display.

13. A method as in claim 1 further comprising an executive knowledge system.

14. A method as in claim 1 further comprising a data translation component.

15. A method as in claim 1 wherein either of said at least two metaphors comprises code.

16. A method as in claim 1 wherein said user interface comprises code.

17. A method as in claim 1 wherein said user interface comprises Hypertext Markup Language (HTML).

18. A method as in claim 1 wherein said interface is compatible with a World Wide Web browser.

19. A method as in claim 1 wherein said user interface is provided through a desktop computer, a personal digital assistant (PDA), or smart phone.

20. A method as in claim 1 further comprising a student educational performance system comprising a theme with a value provided by either of said first or second rules to either of said at least two metaphors, wherein said rule compares said student's expected performance to said student's actual performance, and wherein at least one of said two metaphors consists of a person or progress metaphor.

21. A method as in claim 20 wherein said student's expected performance is set by a parent or guardian.

22. A method as in claim 20 wherein by clicking on or other user interaction with said metaphor, data on said student is shown.

23. A method as in claim 20 wherein said metaphor is modified according to said rule.

24. A method as in claim 20 wherein said modification is through color.

25. A method as in claim 20 wherein said theme is a classroom.

26. A method as in claim 20 wherein said actual performance is a grade of said student.

27. A method as in claim 20 wherein said projected performance is a grade of said student.

28. A computer-based method for isolating and reviewing data comprising an educational performance system configured for:
providing administration, teacher, student, and/or class data data via a data source, said data source providing data through a network to a data storage component, and wherein said data source consists of a data warehouse, data mart, operational datastore, local database, content aggregator, web service, raw data, real time data, line data feed from sensors or raw data generator, and wherein said data storage component consists of a database, spreadsheet, or cache;
providing a rule to said data via a rules engine, said rule comprising a function of the characteristics of relationships among and/or between data;
providing a metaphor wherein said metaphor provides a concrete referent for said data via a metaphor engine, and wherein said metaphor is modified in whole or part via a value provided to said metaphor by said rule, and wherein said consists of a graphic, sound or touch metaphor; and,
providing user perception of said and any modification of said metaphor via a presentation comprising a theme or pattern via user interaction, wherein said interaction consists of user title, user authorization, user issues of concern, and/or enterprise performance metrics within a networked user interface compatible with said metaphor.

29. A method as in claim 28 wherein said metaphor is delinked from said rule, following creation and/or modification according to said rule.

30. A method as in claim 28 wherein said rule consists of uni-variant, multivariant, combinations of data from said data source, and/or is nested.

31. A method as in claim 28 wherein said rule has more than one input and more than one output.

32. A method as in claim 28 wherein said rule is a constant.

33. A method as in claim 28 wherein said rule provides a modification of said metaphor depending upon a range.

34. A method as in claim 33 wherein, if as determined by said rule said data has a value within an acceptable range, then said rule provides a modification to said metaphor.

35. A method as in claim 28 wherein said metaphor provides for user interaction.

36. A method as in claim 28 further comprising an input device.

37. A method as in claim 36 where said input device comprises a mouse, trackball, audio device or touch screen device.

38. A method as in claim 28 wherein said metaphor is interactive.

39. A method as in claim 38 further comprising interaction with said user interface and/or other components of the display.

40. A method as in claim 28 further comprising an executive knowledge system.

41. A method as in claim 28 further comprising a data translation component.

42. A method as in claim 28 wherein said metaphor comprises code.

43. A method as in claim 28 wherein said user interface comprises code.

44. A method as in claim 28 wherein said user interface comprises Hypertext Markup Language (HTML).

45. A method as in claim 28 wherein said user interface is compatible with a World Wide Web browser.

46. A method as in claim 28 wherein said user interface is provided through a desktop computer, a personal digital assistant (PDA), or smart phone.

47. A method as in claim 28 further comprising a student educational performance system comprising a theme with a value provided by said rule to said metaphor, wherein said rule compares said student's expected performance to said student's actual performance, and wherein said metaphor consists of a person or progress metaphor.

48. method as in claim 47 wherein said student's expected performance is set by a parent or guardian.

49. A method as in claim 47 wherein by clicking on or other user interaction with said metaphor, data on said student is shown.

50. A method as in claim 47 wherein said metaphor is modified according to said rule.

51. A method as in claim 47 wherein said modification is through color.

52. A method as in claim 47 wherein said theme is a classroom.

53. A method as in claim 47 wherein said actual performance is a grade of said student.

54. A method as in claim 47 wherein said projected performance is a grade of said student.

55. A computer-based apparatus for isolating and reviewing data comprising an educational performance system configured with:

more than one data source, with at least one of said more than one data source providing administration, teacher, student, and/or class data through a network, to a data storage component, and wherein said more than one data source consists of data warehouses, data marts, operational datastores, local databases, content aggregators, web services, raw data, real time data, line data feed from sensors and/or raw data generators, and wherein said data storage component-consists of a database, spreadsheet, or cache;

a first and second rule for providing said data via a rules engine, said rules comprising a function of the characteristics of relationships among and/or between data;

at least two metaphors each for providing a concrete referent for said data via a metaphor engine, and wherein a first of at least two of said metaphors is modified in whole or part via a value provided to said first metaphor by said first rule, and wherein a second of said at least two metaphors is modified in whole or part via a value provided to said second metaphor by said second rule, and wherein each of said at least two metaphors consist of a graphic, sound and/or touch metaphor; and, a presentation comprising a theme or pattern configured via user interaction for providing user perception of said at least two metaphors and any modification of said at least two metaphors, wherein said interaction consists of user title, user authorization, user issues of concern, and/or enterprise performance metrics within a networked User Interface compatible with said metaphors.

56. An apparatus as in claim 55 wherein at least one of said at least two metaphors is delinked from either of said rules, following creation and/or modification according to said rule.

57. An apparatus as in claim 55 wherein either of said rules consists of uni-variant, multivariant, combinations of data from said data source, and/or is nested.

58. An apparatus as in claim 55 wherein either of said rules has more than one input and more than one output.

59. An apparatus as in claim 55 wherein either of said rules is a constant.

60. An apparatus as in claim 55 wherein either of said rules provides a modification of said at least one of said at least two metaphors depending upon a range.

61. An apparatus as in claim 60 wherein, if as determined by either of said rules said data has a value within an acceptable range, then said rule provides a modification to at least one of said at least two metaphors.

62. An apparatus as in claim 55 wherein at least one of said at least two metaphors provides for user interaction.

63. An apparatus as in claim 55 further comprising an input device.

64. An apparatus as in claim 63 where said input device comprises a mouse, trackball, audio device and/or or touch screen device.

65. An apparatus as in claim 55 wherein at least one of said at least two metaphors is interactive.

66. An apparatus as in claim 65 further comprising interaction with said second of said at least two metaphors, said user interface and/or other components of the display.

67. An apparatus as in claim 55 further comprising an executive knowledge system.

68. An apparatus as in claim 55 further comprising a data translation component.

69. An apparatus as in claim 55 wherein either of said at least two metaphors comprises code.

70. An apparatus as in claim 55 wherein said user interface comprises code.

71. An apparatus as in claim 55 wherein said user interface comprises Hypertext Markup Language (HTML).

72. An apparatus as in claim 55 wherein said user interface is compatible with a World Wide Web browser.

73. An apparatus as in claim 55 wherein said user interface is provided through a desktop computer, a personal digital assistant (PDA), or smart phone.

74. An apparatus as in claim 55 further comprising a student educational performance system comprising a theme with a value provided by either of said first or second rules to either of said at least two metaphors, wherein said rule compares said student's expected performance with said student's actual performance, and wherein at least one of said two metaphors consists of a person or progress metaphor.

75. An apparatus as in claim 74 wherein said student's expected performance is set by a parent or guardian.

76. An apparatus as in claim 74 wherein by clicking on or other user interaction with said metaphor, data on said student is shown.

77. An apparatus as in claim 74 wherein said metaphors may be modified according to said rule.

78. An apparatus as in claim 74 wherein said modification is through color.

79. An apparatus as in claim 74 wherein said theme is a classroom.

80. An apparatus as in claim 74 wherein said actual performance is a grade of said student.

81. An apparatus as in claim 74 wherein said projected performance is a grade of said student.

82. A computer-based apparatus for isolating and reviewing data comprising an educational performance system configured with:
- a data source, with said data source providing administration, teacher, student, and/or class data through a network, to a data storage component, and wherein said data source consists of a data warehouse, data mart, operational datastore, local database, content aggregator, web service, raw data, real time data, line data feed from sensors or raw data generator, and wherein said data storage component consists of a database, spreadsheet, or cache;
- a rule for providing said data via a rules engine, said rule comprising a function of the characteristics of relationships among and/or between data;
- a metaphor for providing a concrete referent for said data via a metaphor engine, and wherein said metaphor is modified in whole or part via a value provided to said metaphor by said rule, and wherein said metaphor consists of a graphic, sound or touch metaphor; and,
- a presentation comprising a theme or pattern configured via user interaction for providing user perception of said metaphor and any modification of said metaphor, wherein said interaction consists of user title, user authorization, user issues of concern, and/or enterprise performance metrics within a networked user interface compatible with said metaphor.

83. An apparatus as in claim 82 wherein said metaphor is delinked from said rule, following creation and/or modification according to said rule.

84. An apparatus as in claim 82 wherein said rule consists of uni-variant, multivariant, combinations of data from said data source, or is nested.

85. An apparatus as in claim 82 wherein said rule has more than one input and more than one output.

86. An apparatus as in claim 82 wherein said rule is a constant.

87. An apparatus as in claim 82 wherein said rule provides a modification of said metaphor depending upon a range.

88. A method as in claim 87 wherein, if as determined by said rule said data has a value within an acceptable range, then said rule provides a modification to said metaphor.

89. An apparatus as in claim 82 wherein said metaphor provides for user interaction.

90. An apparatus as in claim 82 further comprising an input device.

91. An apparatus as in claim 90 where said input device comprises a mouse, trackball, audio device or touch screen device.

92. An apparatus as in claim 82 wherein said metaphor is interactive.

93. An apparatus as in claim 92 further comprising interaction with said user interface and/or other components of the display.

94. An apparatus as in claim 82 further comprising an executive knowledge system.

95. An apparatus as in claim 82 further comprising a data translation component.

96. An apparatus as in claim 82 wherein said metaphor comprises code.

97. An apparatus as in claim 82 wherein said user interface comprises code.

98. An apparatus as in claim 82 wherein said user interface comprises Hypertext Markup Language (HTML).

99. An apparatus as in claim 82 wherein said user interface is compatible with a World Wide Web browser.

100. An apparatus as in claim 82 wherein said user interface is provided through a desktop computer, a personal digital assistant (PDA), or smart phone.

101. An apparatus as in claim 82 further comprising a student educational performance system comprising a theme with a value provided by said rule to said metaphor, wherein said rule compares said student's expected performance with said student's actual performance, and wherein said metaphor consists of a person or progress metaphor.

102. An apparatus as in claim 101 wherein said student's expected performance is set by a parent or guardian.

103. An apparatus as in claim 101 wherein by clicking on or other user interaction with said metaphor, data on said student is shown.

104. An apparatus as in claim 101 wherein said metaphor may be modified according to said rule.

105. An apparatus as in claim 101 wherein said modification is through color.

106. An apparatus as in claim 101 wherein said theme is a classroom.

107. An apparatus as in claim 101 wherein said performance is a grade of said student.

108. An apparatus as in claim 101 wherein said projected performance is a grade of said student.

* * * * *